United States Patent
Nallamothu

(10) Patent No.: US 10,623,322 B1
(45) Date of Patent: Apr. 14, 2020

(54) DYNAMIC PREFIX LIST FOR ROUTE FILTERING

(71) Applicant: Juniper Networks, Inc., Sunnyvale, CA (US)

(72) Inventor: Vinay K Nallamothu, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1 day.

(21) Appl. No.: 15/706,583

(22) Filed: Sep. 15, 2017

(51) Int. Cl.
*H04L 12/813* (2013.01)
*H04L 12/741* (2013.01)
*H04L 12/755* (2013.01)
*H04L 12/725* (2013.01)

(52) U.S. Cl.
CPC .......... *H04L 47/20* (2013.01); *H04L 45/021* (2013.01); *H04L 45/54* (2013.01); *H04L 45/745* (2013.01); *H04L 45/306* (2013.01)

(58) Field of Classification Search
CPC ....... H04L 47/20; H04L 45/745; H04L 45/54; H04L 45/021; H04L 45/306
See application file for complete search history.

(56) References Cited

U.S. PATENT DOCUMENTS

| | | | | |
|---|---|---|---|---|
| 7,215,637 B1 * | 5/2007 | Ferguson | ................ | H04L 45/00 370/230.1 |
| 7,420,929 B1 * | 9/2008 | Mackie | ................. | H04L 43/026 370/252 |
| 7,571,156 B1 * | 8/2009 | Gupta | ..................... | H04L 45/00 |
| 8,953,500 B1 * | 2/2015 | Shen | ....................... | H04L 45/16 370/238 |
| 9,021,098 B1 * | 4/2015 | Nagle | ..................... | H04L 61/20 709/226 |

(Continued)

FOREIGN PATENT DOCUMENTS

WO 2013184846 A1 12/2013

OTHER PUBLICATIONS

"Understanding Prefix Lists for Use in Routing Policy Match Conditions," Juniper Networks, Inc.,Tech Library, Junos OS, accessed on Jun. 21, 2017, from https://www.juniper.net/documentation/en_US/junos/topics/usage-guidelines/policy-configuring-prefix-lists-for-use-in-routing-policy-match-conditions.html, 4 pp.

(Continued)

*Primary Examiner* — Ivan O Latorre
(74) *Attorney, Agent, or Firm* — Shumaker & Sieffert, P.A.

(57) ABSTRACT

In general, techniques are described for a dynamic prefix list for route filtering. In one example, a network device comprises a control unit comprising one or more processors; one or more interface cards coupled to the control unit; a routing protocol process configured to execute on the control unit to exchange, using the interface cards, routing protocol advertisements with a peer network device in accordance with a routing protocol; and a configuration database comprising a routing policy that references a dynamic prefix list comprising one or more prefixes. The routing policy includes at least one action for application to routes for import or export, by the network device via a routing protocol, that match any of the one or more prefixes of the dynamic prefix list. The dynamic prefix list comprises a routing table to store the one or more prefixes, the routing table separate from the configuration database.

20 Claims, 4 Drawing Sheets

(56) References Cited

U.S. PATENT DOCUMENTS

| | | | |
|---|---|---|---|
| 9,571,387 B1* | 2/2017 | Atlas | H04L 45/50 |
| 2003/0154304 A1* | 8/2003 | Pesce | H04L 41/0206 |
| | | | 709/238 |
| 2006/0209851 A1* | 9/2006 | Scudder | H04L 45/02 |
| | | | 370/401 |
| 2006/0233181 A1* | 10/2006 | Raszuk | H04L 45/02 |
| | | | 370/401 |
| 2006/0268681 A1* | 11/2006 | Raza | H04L 45/02 |
| | | | 370/216 |
| 2008/0089348 A1* | 4/2008 | Appanna | H04L 45/02 |
| | | | 370/401 |
| 2008/0307110 A1* | 12/2008 | Wainner | H04L 63/104 |
| | | | 709/238 |
| 2009/0296579 A1* | 12/2009 | Dharwadkar | H04L 12/4641 |
| | | | 370/235 |
| 2010/0142543 A1* | 6/2010 | Shaikh | H04L 45/04 |
| | | | 370/401 |
| 2012/0063460 A1* | 3/2012 | Hallivuori | H04L 45/02 |
| | | | 370/392 |
| 2012/0127997 A1* | 5/2012 | Zinjuwadia | H04L 45/04 |
| | | | 370/392 |
| 2013/0163427 A1 | 6/2013 | Beliveau et al. | |
| 2014/0201247 A1* | 7/2014 | Kirazci | G06F 16/9027 |
| | | | 707/803 |
| 2015/0092785 A1* | 4/2015 | Torvi | H04L 45/04 |
| | | | 370/401 |
| 2015/0263952 A1* | 9/2015 | Ganichev | H04L 45/745 |
| | | | 370/389 |
| 2015/0295815 A1* | 10/2015 | Retana | H04L 45/26 |
| | | | 709/242 |
| 2016/0226760 A1* | 8/2016 | Liljenstolpe | H04L 45/74 |
| 2016/0359699 A1* | 12/2016 | Gandham | H04L 63/1425 |
| 2017/0155587 A1* | 6/2017 | Bannister | H04L 45/48 |
| 2017/0230241 A1* | 8/2017 | Neginhal | H04L 41/0803 |

OTHER PUBLICATIONS

"Example: Configuring Routing Policy Prefix Lists," Juniper Networks, Inc., Tech Library, Junos OS, accessed on Jun. 21, 2017, from https://www.juniper.net/documentation/en_US/junos/topics/example/policy-prefix-list.html.

"Dynamic Prefix Lists—Sys Admin Blog—Sys admin tips, configs, and more," Juniper Networks, Inc., accessed on Jun. 21, 2017, from https://sysadminblog.net/guides-and-snippets/juniper/dynamic-prefix-lists/, 3 pp.

Rosen et al., "MPLS Label Stack Encoding," RFC 3032, Network Working Group, Jan. 2001, 23 pp.

"Understanding Route Filters for Use in Routing Policy Match Conditions," Juniper Networks, Inc., Tech Library, Junos OS, modified Nov. 22, 2016, 12 pp.

"Routing Policies, Firewall Filters, and Traffic Policers Feature Guide," Juniper Networks, Inc., Tech Library, Junos OS, Aug. 22, 2017, 1646 pp.

"OpenFlow Switch Specification—Version 1.1.0 Implemented (Wire Protocol 0x02)—openflow-spec-v1.1.0," Open Networking Foundation, Feb. 28, 2011, 58 pp.

Gredler et al., "Egress Peer Engineering using BGP-LU, draft-gredler-idr-bgplu-epe-11," Internet-Draft, Inter-Domain Routing, Oct. 6, 2017, 15 pp.

* cited by examiner

DYNAMIC PREFIX LIST FOR ROUTE FILTERING

TECHNICAL FIELD

The invention relates to computer networks and, more particularly, to computer network routing.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to reseed only those individual packets that may be lost during transmission.

Network routers maintain routing information that describes available routes through the network. Upon receiving a packet, a router examines information within the packet and forwards the packet in accordance with the routing information. In order to maintain an accurate representation of the network, routers exchange routing information in accordance with one or more routing protocols, such as an interior gateway protocol (IGP) or Border Gateway Protocol (BGP). Routing information imported by a router or statically configured by an operator is stored in routing tables of the router and may be subsequently advertised by the routing protocols to the router's neighbors.

Routers operate according to a routing policy framework that is configurable to permit the network operator to control the flows of routing information and packets. A routing policy for a router controls the flow of routing information between the routing protocols and the routing tables as well as between the routing tables and the forwarding table. Import routing policies control the routing information that is placed in the routing tables, and export routing policies control the routing information that is advertised from the routing tables.

SUMMARY

In general, techniques are described for a dynamic prefix list for route filtering. Unlike a prefix list that is statically configured in the configuration data for the router by an operator using a management interface, a dynamic prefix list is implemented using a routing table, which may be implicitly created by the router or explicitly created by an operator. In addition, the routing policy language for expressing routing policies of the router is extended to use, in place of a prefix list, the routing table operating as a dynamic prefix list within routing policies for the router. By enabling the addition of static routing entries to the routing table, the techniques replicate the existing functionality offered by a static prefix list and extend that functionality to incorporate the benefits of a routing table in the areas of configurability, flexibility, speed, monitoring, and/or resource utilization, for instance.

Depending on the use case, whenever the contents of a dynamic prefix list referenced by a routing policy is updated, the router may reevaluate the routes that are evaluated by the routing policy. To efficiently handle changes to the dynamic prefix list contents, a policy engine for the router can register for route notification events on the routing table used for the dynamic prefix list. Accordingly, upon receiving a route notification event for a prefix being added to or deleted from the dynamic prefix list, the policy engine can efficiently lookup the routes matching the prefix in the routing table referred to by a routing policy and reevaluate the routing policy only for the affected routes. This may reduce router processor utilization as compared with a static prefix list referenced by a routing policy in which all the routes in the routing table must be reevaluated by the policy engine vis-à-vis the updated list of prefixes.

In one example, a control unit comprises one or more processors; one or more interface cards coupled to the control unit; a routing protocol process configured to execute on the control unit to exchange, using the interface cards, routing protocol advertisements with a peer network device in accordance with a routing protocol; and a configuration database comprising a routing policy that references a dynamic prefix list comprising one or more prefixes, wherein the routing policy includes at least one action for application to routes for import or export, by the network device via a routing protocol, that match any of the one or more prefixes of the dynamic prefix list, and wherein the dynamic prefix list comprises a routing table to store the one or more prefixes, the routing table separate from the configuration database.

In one example, a data center comprises an egress node that is connected via respective peering links to a plurality of service provider networks providing network reachability to destinations; one or more leaf switches connected to the egress node; a route reflector comprising a dynamic prefix list and exposing an application programming interface for configuring the dynamic prefix list; a controller configured to invoke the application programming interface of the egress node to add one or more prefixes to the dynamic prefix list, wherein the egress node is configured to apply egress peer engineering to advertise, for receipt by the leaf switches, multiple labeled routes for each prefix of the one or more prefixes of the dynamic prefix list, the multiple labeled routes corresponding to the respective peering links of the plurality of service provider networks, wherein the route reflector is configured to receive the multiple labeled routes and advertise, for receipt by the leaf switches, a default route for at least one prefix that is not one of the one or more prefixes of the dynamic prefix list.

In one example, a method comprises executing, by a routing protocol process of a network device, a routing protocol to exchange routing protocol advertisements with a peer network device; and storing, to a configuration database, a routing policy that references a dynamic prefix list comprising one or more prefixes, wherein the routing policy includes at least one action for application to routes for import or export, by the network device via the routing protocol, that match any of the one or more prefixes of the dynamic prefix list; and storing, to a routing table, the one or more prefixes for the dynamic prefix list, the routing table separate from the configuration database.

In one example, a non-transitory computer-readable medium comprising instructions for causing one or more programmable processors to: executing, by a routing protocol process of a network device, a routing protocol to exchange routing protocol advertisements with a peer network device; and storing, to a configuration database, a routing policy that references a dynamic prefix list comprising one or more prefixes, wherein the routing policy includes at least one action for application to routes for import or export, by the network device via the routing protocol, that match any of the one or more prefixes of the dynamic prefix list; and store, to a routing table, the one or more prefixes for the dynamic prefix list, the routing table separate from the configuration database.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
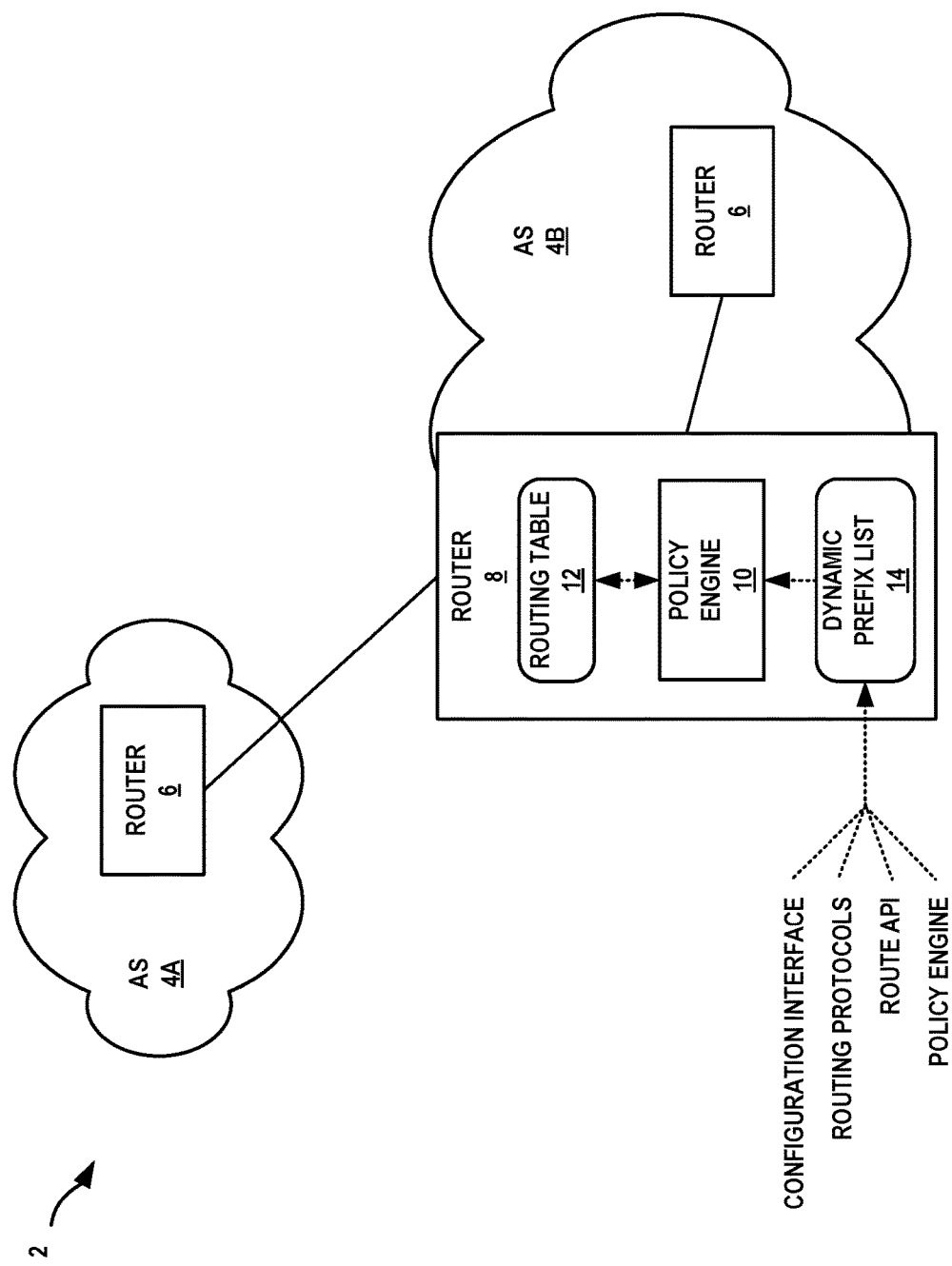
FIG. 1 is a block diagram illustrating a network system including a router configured with a dynamic prefix list for filtering routes for import or export via a routing protocol, according to techniques described herein.

FIG. 1 is a block diagram illustrating a network system including a router configured with a dynamic prefix list for filtering routes for import or export via a routing protocol, according to techniques described herein. Network system 2 includes autonomous systems 4A-4B (illustrated as "ASes 4A-4B" and collectively referred to herein as "autonomous systems 4") interconnected by communication links. The term "communication link," as used herein, comprises any form of transport medium, wired or wireless, and can include intermediate nodes such as network devices. Network system 2 may in some instances represent the Internet or any other publicly accessible computer network, a private network, or a virtual private network (VPN).

Each of autonomous systems 4 runs one or more interior gateway protocols (IGPs), such as Open Shortest Path First (OSPF), Routing Information Protocol (RIP), Intermediate System-to-Intermediate System (IS-IS), Interior Gateway Routing Protocol (IGRP), Enhanced IGRP (EIGRP), and Interior Border Gateway Protocol (iBGP), and each of autonomous systems 4 includes a set of one or more routers 6, 8 operating within a single administrative domain according to a routing policy. Autonomous systems 4 each have an identification number provided by an Internet registry or by an Internet service provider (ISP) that uniquely identifies the autonomous system to other autonomous systems. In some instances, the identification number may be drawn from a private identifier number space and therefore unique only within a private network comprising ASes 4. In various embodiments, each of autonomous systems 4 may represent a service provider network, an enterprise or campus network, a content access network (CAN), or a content delivery network (CDN), for example. In addition, one or more service providers, content provider, or enterprise/campus network administrators may administer any one or more of autonomous systems 4, Routers of autonomous systems 4 implement at least one routing protocol to route packets from a source network addresses to destination network addresses, and each of autonomous system 4 may offer network packet delivery to a network (or subnet) of one or more endpoints identified by a network address prefix that encompasses the network address range defined by the network addresses of endpoints.

Routing information exchanged via routing protocols may include topology information for one or more network layer protocols. For example, router 6 advertises routing information to router 8 that is received from one or more interior routing protocol speakers of AS 4A executing an IGP, such as Internal BGP (iBGP), Open Shortest Path First, Routing Information Protocol, or Intermediate System to Intermediate System. Topology information may also include administratively configured routes or other information on router 6. Network layer protocols may include Internet Protocol version 4 (IPv4), Internet Protocol version 6 (IPv6), Layer 2 Virtual Private Networking (L2VPN), Layer 3 VPN (L3VPN), and BGP with Traffic Engineering extensions (BGP-TE).

Router 8 is a network device that executes routing protocols to exchange routing information with other routers 6 of network system 2. While illustrated as directly coupled to a different autonomous system 4A, router 8 may in some cases only be coupled to other routers 6 of autonomous system 4B. Router 8 is not directly coupled to a different autonomous system in some examples. Router 8 includes a policy engine 10 and at least one routing table 12.

Routing table 12 is a list of known destinations or destination networks and directions on how to reach the network. Each entry in a routing table ("a route entry or route") is identified by the destination network to which traffic can be forwarded. The destination network, which may be represented by an IP address and netmask, can be an IP network, subnetwork, supernet, or a host device. Routing table entries can originate from the following sources (1) directly connected networks, dynamic routing protocols such as OSPF, BGP, or RIP, routes that are imported from other routers or virtual routers, and statically configured routes. Only one routing table 12 is illustrated for simplicity. Router 8 may include many routing tables for respective protocols.

Routing table 12 may represent a default routing table for router 8. The default routing table may include a routing table for unicast IPv4 routes, a routing table for multicast IPv4 routes, a routing table for unicast IPv6 routes, a routing table for Multiprotocol Label Switching (MPLS) information, and so forth. Routing table 12 may alternatively be explicitly configured in configuration data (not shown in FIG. 1) for router 8 as a named routing table.

Router 8 uses the collected routing information in routing table 12 to select the active route to each destination, which is the route used by router 8 to forward incoming packets to that destination. To route traffic from a source host to a destination host via router 8, e.g., router 8 learns the path that the packet is to take.

Policy engine 10 of router 8 applies routing policies (not shown in FIG. 1) to routes to control the routes, received via one or more routing protocol, being stored to routing table 12 and to control the routes being advertised from routing table 12 to neighboring routers 6 via one or more routing protocols. Storing a received route to routing table 12 is referred to as importing the route. Outputting a route from routing table 12 via a routing protocol is referred to as exporting the route. A routing policy may be an import routing policy (or "import policy") or an export routing policy (or "export policy").

An operator or controller for router 8 may configure the routing policies applied by policy engine 10 using a management interface. A routing policy is stored to configuration database of router 8 and may include the following configurable components: match conditions, actions, and terms. Match conditions are criteria against which a route is compared, and, if the criteria match, the router applies one or more actions. Terms are named structures in which match conditions and actions are defined. A routing policy may include one or more terms. The router policy engine (or other component of the router that applies routing policies) evaluates each incoming and outgoing route against the match conditions in a term. If the criteria in the match conditions are met, the router policy engine takes the specified action(s), e.g., accept or reject the route.

A route filter for a routing policy is a collection of match prefixes, where a prefix refers to a network address prefix and each match prefix also includes a match type defining the match condition for the prefix, such as exact, longer, orlonger, range, too, and so forth. A prefix list for a routing policy is similar to a route filter but is not usable for specifying a range. However, a routing policy may refer to a prefix list that is stored to the configuration database of the router. A prefix list may be therefore referenced in many different types of routing policies within the router 8 configuration information stored to the configuration database, such as a Border Gateway Protocol import policy, an export policy, a reverse path forwarding (RPF) policy, in firewall filters, in loopback filters, in setting multicast scope, and so forth.

As one example, the set of prefixes in a prefix list may be used by router 8 as match conditions in a routing policy that needs to specify a large list of customer routes and takes action based on the presence or absence of a matching prefix. The routing policy may include a reference to the prefix list to direct the policy engine 10 to obtain the list of prefixes from the prefix list stored to the configuration database for use as match conditions. A prefix list may be configured with an identifier for referencing the prefix list in a routing policy, such as a name for the prefix list (e.g., "prefix-list-1"). In this way, the more complex policy logic represented in the routing filters may be configured once, with minimal per-device and per-site customizations. Changing the match conditions for the routing policy for routing filtering may therefore be done by reconfiguring the prefix list in the configuration database. Like the routing policies, an operator or controller for router 8 may configure the prefix list referenced by a routing policy applied by policy engine 10 using a management interface.

Changes to the configuration database, including changes to a routing policy or to a prefix list, may cause the router 8 to reevaluate all routes in routing table 12 against the new/modified routing policies to determine the action for each route (e.g., accept or reject). Processing configuration database changes is therefore processor-intensive, particularly in a highly scaled router storing a large number of routes in routing table 12, having a large number of routing policies or match conditions (for instance, a large prefix list). As a result, a change to a prefix list in the configuration database may result in the router 8 utilizing significant processing resources and causing latency for other events in the router 8 system. In cases in which an external controller (not shown) in FIG. 1 uses a route application programming interface (API) for adding prefixes to a prefix list in the configuration database, the external controller may frequently update the prefix list, which may further strain the processing resources of the router 8 when reevaluating the routing table 12 against the routing policy referencing the frequently updated prefix list.

In accordance with techniques described herein, router 8 includes a dynamic prefix list 14. Unlike a prefix list that is statically configured in the configuration data for router 8 by an operator or controller using a management interface, dynamic prefix list 14 is implemented using a routing table, which may be implicitly created by an application or operating system executed by router 8, or explicitly created by an operator or controller. In other words, dynamic prefix list 14 is represented using a routing table that may be configurable in a manner similar to routing table 12, as described above. Unlike a prefix list, dynamic prefix list 14 is not stored to the configuration database for router 8 but may be stored in a manner similar to other routing tables for router 8. In some cases, static routes for the dynamic prefix list 14 may be stored to the configuration database and imported into the routing table for dynamic prefix list 14 during operation of router 8. By enabling the addition of static routing entries to the routing table, the techniques replicate the existing functionality offered by a prefix list and extend that functionality to incorporate the benefits of a routing table in the areas of configurability, flexibility, speed, monitoring, and/or resource utilization, for instance. In some cases, the operator or controller may create a routing table for dynamic prefix list 14, via a management interface, by modifying the configuration database for router 8. As used herein, operations with respect to the routing table used to implement and store dynamic prefix list 14 may be described hereinafter directly with respect to dynamic prefix list 14.

In operation, router 8 is configured with configuration information that conforms to a routing policy language extended to use, in place of a prefix list, the routing table operating as a dynamic prefix list 14 for reference by routing policies for router 8. That is, using the extended routing policy language, an operator or controller may define a routing policy that references a routing table for dynamic prefix list 14 in order to use prefixes of the dynamic prefix list 14 (again, stored to the routing table) as match criteria for one or more routes. Additional details of an example routing policy language, which may be extended according to techniques described herein, is found in "Routing Policies, Firewall Filters, and Traffic Policers Feature Guide," Juniper Networks, Inc., Aug. 22, 2017, which is incorporated herein by reference in its entirety.

If the prefixes of dynamic prefix list 14 referenced by such a routing policy are updated, policy engine 10 of router 8 may reevaluate the routes according to the routing policy that is updated by referencing the updated dynamic prefix list 14. Router 8 enables applications to create callbacks or other route notifications events for specific routes within a routing table. The routes in the routing table for dynamic prefix list 14 are prefixes configured for dynamic prefix list 14. To efficiently handle changes to the dynamic prefix list 14 contents, policy engine 10 may register for route notification events on routes of the routing table used for the dynamic prefix list 14. Each such route notification event may specify the corresponding route in the dynamic prefix list 14 that has been added, updated, or deleted and for which the route notification event was generated.

Accordingly, upon receiving a route notification event indicating a route, the policy engine 10 can efficiently lookup any routes in routing table 12 matching the route in dynamic prefix list 14 that is referred to by a routing policy and reevaluate the routing policy only for the affected, matching routes of routing table 12. The policy engine 10 may therefore avoid reevaluating routes of routing table 12 that do not match the route indicated in the route notification event, i.e., the updated prefix for dynamic prefix list 14. The lookup and reevaluation operation may reduce router 8 processor utilization, e.g., in the routing engine/control plane, as compared with a prefix list referenced by a routing policy in which all routes in the routing table 12 must be reevaluated by the policy engine 10 against all prefixes in the prefix list.

Using a routing table to implement dynamic prefix list 14 for router 8 may provide one or more additional or alternative advantages. For example, a dynamic prefix list 14 accessible apart from the configuration database of the router 8 may avoid configuration changes and the concomitant reapplication of the configured routing policies to all routes stored by routing table 12 of router 8, which can be a processor-intensive operation. The techniques by contrast may provide a scalable, sustainable solution that supports frequent modifications to the dynamic prefix list 14.

As another example, router 8 provides additional mechanisms for configuring routing tables, other than the management interface (e.g., a command-line interface) for also configuring the configuration database. For example, an application external or internal to the router 8 may use the route API described above to add routes to dynamic prefix list 14. A software-defined networking (SDN) controller may, as a result, use the techniques enabled by router 8 to influence the route selection process. The routing table for dynamic prefix list 14 may enable each route to be associated with the application that added the route to dynamic prefix list 14. Multiple applications may actively modify the contents of dynamic prefix table 14. As a result, when an application that has installed one or more prefixes terminates, the router 8 can quickly identify the one or more prefixes associated in the routing table with the application and remove them from dynamic prefix list 14.

As another example, unlike a conventional prefix list, the dynamic prefix list 14 implemented using a routing table, as described herein, may be advertised or otherwise distributed to protocol peers of the router. Such protocols or other components of the router may set traps on the routing table for dynamic prefix list 14 to receive notifications whenever the contents of dynamic prefix list 14 changes. In some cases, additional actions and attributes may also be attached to prefixes of the dynamic prefix table 14, which may be usable by policy engine 10 for making decisions and thus enable a unique action per-prefix of the dynamic prefix list 14.

In addition, routes received by router 8 via one or more routing protocols may be added to the dynamic prefix list 14, in contrast to a prefix list stored to the configuration database. Policy engine 10 may add routes to the dynamic prefix list 14, in contrast to a prefix list stored to the configuration database. As noted above, static routes may be added to dynamic prefix list 14 via a management interface such that the dynamic prefix list 14 may be a mix of static (i.e., configured in the configuration database for router 8) and dynamic prefixes (i.e., configured in the configuration database for router 8). The existing management display functionality of router 8 for a routing table may be used to output the dynamic prefix list 14 for display. In the examples mentioned above, the routing table implementation for dynamic prefix list 14 thus enables configuration of a prefix list for a routing policy using (1) a configuration interface, (2) one or more routing protocols, (3) a route API, and/or (4) policy engine 10.

Figure 2:
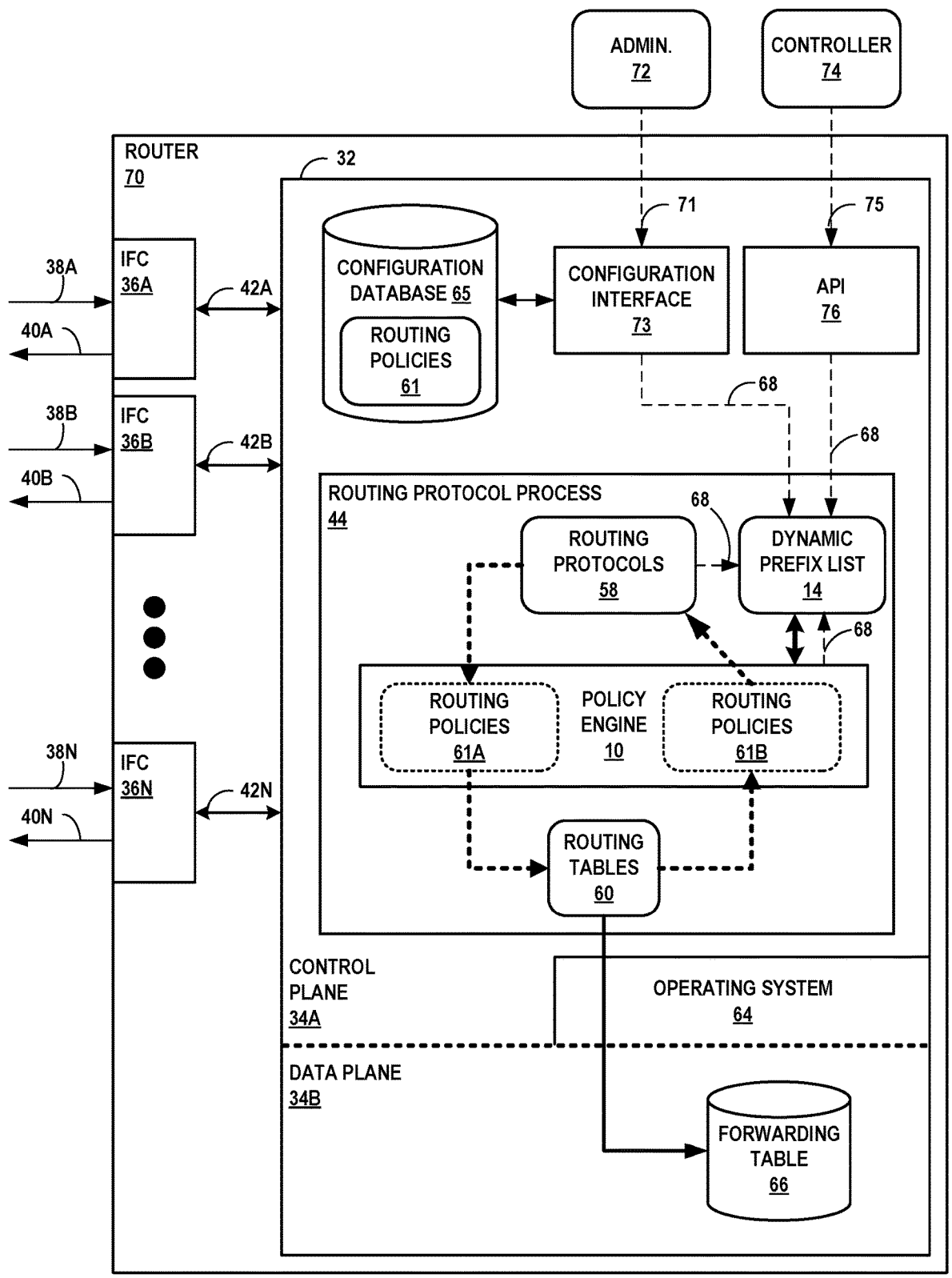
FIG. 2 is a block diagram illustrating an example of a router that uses a dynamic prefix list for a routing policy, in accordance with techniques of the disclosure.

FIG. 2 is a block diagram illustrating an example of a router that uses a dynamic prefix list for a routing policy, in accordance with techniques of the disclosure. For purposes of illustration, example router 70 may be described in the context of network system 2 and may represent an example instance of router 8 of FIG. 1.

Router 70 includes a control unit 32 and interface cards 36A-36N ("IFCs 36") coupled to control unit 32 via internal links 42A-42N. Control unit 32 may comprise one or more processors (not shown in FIG. 2) that execute software instructions, such as those used to define one or more software or computer programs, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, control unit 32 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 32 is divided into two logical or physical "planes" to include a first control or routing plane 34A ("control plane 34A") and a second data or forwarding plane 34B ("data plane 34B"), That is, control unit 32 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 34A represents hardware or a combination of hardware and software of control unit 32 that define control plane functionality of router 70. Control plane 34A manages and controls the behavior of router 70, including the behavior of data plane 34B. Operating system 64 of control plane 34A provides a run-time environment for multiple different processes. Operating system 64 may represent, for example, a UNIX operating system derivative such as Linux or Berkeley Software Distribution (BSI). Operating system 64 offers libraries and drivers by which processes may interact with data plane 34B, for example, or other hardware of router 70, including a file-system, storage device(s), and main memory for router 70. Libraries and drivers of operating system 64 may include Application Programming Interfaces (APIs) that provide standard interfaces for developers to invoke the functionality of operating system 64 and router 70 exposed by the libraries and drivers.

Control plane 34A executes one or more processes. Routing protocol process 44 ("RP module 44") represents a routing protocol process that executes one or more routing protocols 58 by which at least some of the routing information stored to one or more routing tables 60 may be determined. Routing tables 60 represent a data structure for storing routing information and may represent tables, lists, trees/tries, or other data structures. Routing tables 60 may represent example instances of routing table 12 of FIG. 1. A routing table may alternatively be referred to as a routing information base or may alternatively be considered a data structure within the routing information base of the router 70.

Routing tables 60 stored to a computer-readable storage device of control unit 32 (not shown in FIG. 2) may include information defining at least a portion of a topology of a network, such as network system 2 of FIG. 1. Dynamic prefix list 14 may be one of routing tables 60 though illustrated separately for purposes of description. Each of routing tables 60 may be associated with a different address family or network layer protocol, such as unicast or multicast 1Pv4 and 1Pv6, and MPLS. Any one or more of routing tables 60 may be predefined by the routing protocol process 44 or may be explicitly created by an administrator 72 using configuration interface 70 or by controller 74 using application programming interface (API) 76. Router 70 receives configuration data via the configuration interface 70 or API 76 and stores the configuration data to configuration database 65.

Configuration interface 73 is a process executing on control plane 34B that provides an interface by which administrator 72, a network operator or network management system for instance, may modify the configuration database 65 of router 70. Configuration interface 73 may present a Command Line Interface (CLI) and/or a graphical user interface (GUI) by which an administrator or other management entity may modify the configuration of router 70 using text-based commands and/or graphical interactions, respectively. In addition, or in the alterative, configuration interface 73 may present an agent that receives Simple Network Management Protocol (SNMP) or Netconf commands from a management device to set and retrieve configuration information in configuration database 65 for router 70.

Application programming interface 76, in the illustrated example, is an API by which a controller 74 may modify the configuration database 65 or modify any of routing tables 60 (including dynamic prefix list 14). Controller 74 may represent a network management system, a software-defined networking (SDN) controller, and/or orchestration system. API 76 may be a HTTP-based RESTful interface using JavaScript Object Notation (JSON) or eXtensible Markup Language data objects for exchanging configuration data and routing information between the controller 74 and the router 70. API 76 may be another type of API, such as a Remote Procedure Call (RPC) based API.

Routing protocol process 44 resolves the topology defined by routing information in routing tables 60 to select and/or determine one or more active routes through the network. Routing protocol process 44 may then synchronize data plane 34B with these active routes, where data plane 34B maintains a representation of these routes as forwarding table 66 (alternatively, "forwarding information base (FIB) 66"). Routing protocol process 44 may generates forwarding table 66 in the form of a radix or other lookup tree to map packet information (e.g., header information having destination information and/or a label stack) to next hops and ultimately to interface ports of IFCs 36. The operating system 64 kernel may maintain a master copy of the forwarding table 66 and install portions of the master copy to forwarding components of data plane 34B, such as packet forwarding engines.

Forwarding or data plane 34B represents hardware or a combination of hardware and software of control unit 32 that forwards network traffic in accordance with forwarding table 66. Data plane 34B may include one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, that is insertable within a router 70 chassis or combination of chassis.

In accordance with techniques of this disclosure, dynamic prefix list 14 may be an explicitly-created routing table. Example configuration data for explicitly creating dynamic prefix list 14 is as follows:

```
routing-options {
    rib {
        <ROUTE-TABLE-NAME> {
            # static route entries
            static {
                route 192.168.1.0/24 . . .
                route 192.168.0.0/16 . . .
            }
        }
    }
}
```

In the above example, ROUTE-TABLE-NAME is configured as an explicitly-created routing table for dynamic prefix list 14 and is further configured to include two static routes. In other words, dynamic prefix list 14 includes the two static routes due to the configuration. Administrator 72 via configuration interface 73 or controller 74 via API 76 may create the routing table for dynamic prefix list 14 by sending configuration data for the routing table for addition to configuration database 65. In response to receiving the configuration data defining dynamic prefix list 14, control plane 34A processes the configuration data, creates the routing table for dynamic prefix list 14, and adds the static routes to dynamic prefix list 14. Static routes are optional for a dynamic prefix list.

In general, API 76 is exposed by routing protocol process 44 to allow applications to add or modify routes of the routing information base/routing tables 66. Routing protocol process 44 processes and downloads select routes to the forwarding table.

API 76 may include an add route method by which API 76 receives routes for adding to any of routing tables 60. The add route method may include parameters for one or more routes and an identifier of the routing table to which to add the one or more routes. A route may be defined using at least a destination prefix and prefix length, and optionally a next hop. A routing table may be specified for each route. In response to receiving data invoking an add route method of API 76, routing protocol process 44 adds routes included in the data to the routing table specified by the data. Configuration interface 73 may include an add route command for adding a route to any of routing tables 60. The add route command may include parameters for one or more routes and an identifier of the routing table(s) to which to add the one or more routes. In response to receiving an add route command, routing protocol process 44 adds routes included in the data to the routing table specified by the add route command.

API 76 may also include a delete route method by which API 76 receives a request to delete one or more routes from any of routing tables 60. The delete route method may include parameters for the one or more routes to be deleted and the identifier of the routing table from which the routes are to be deleted. In response to receiving data invoking a delete route method of API 76, routing protocol process 44 deletes the routes specified in the data from the routing table(s) specified by the data. API 76 may also include methods for reading routes from a routing table or updating routes in a routing table, with corresponding actions by the API and routing protocol process 44. Configuration interface 73 may include a delete route command for deleting a route from any of routing tables 60. The delete route command may include parameters for one or more routes and an identifier of the routing table from which to delete the one or more routes. In response to receiving a delete route command, routing protocol process 44 deletes the routes included in the data from the routing table specified by the delete route command. Configuration interface 73 may include commands for displaying the routes stored by any of routing tables 60.

API 76 may also include a notify method by which an application, such as a controller 74 may register for asynchronous route update notifications. In response to receiving data invoking a notify method of API 76 for an application and specifying a routing table, routing protocol process 44 stores communication session or other registration information for sending data describing route updates to the routing table to the application. When routing protocol process 44 modifies the routing table to add, delete, or modify a route, routing protocol process 44 may use the registration information to send data describing the modification to the application.

Configuration interface 73 and/or API 76 receive configuration data defining routing policies 61, also stored to configuration database 65. Routing policies 61 may include one or more import routing policies 61A and one or more export policies 61B, which are illustrated in dashed lines within policy engine 10 to indicate the policies 61A, 61B are applied by policy engine 10 of routing protocol process 44 though stored to configuration database 65. Policy engine 10 applies import routing policies 61A to determine the routes from routing protocols 58 that are to be imported to routing tables 60. Policy engine 10 applies export routing policies 61B to determine the routes from routing tables 60 that are to be exported to routing protocols 58.

In the example of router 70, dynamic prefix list 14 is a routing table. While a prefix list stored to configuration database 65 may be modified only by configuration interface 73, router 70 enables modification by many applications and components of router 70. As one example, administrator 72 may use configuration interface 73 to send configuration data for a route 68 that is a new static route. Configuration interface 73 may update the configuration for dynamic prefix list 14 with route 68 in the configuration database 65. In response, routing protocol process 44 may update dynamic prefix list 14 (the routing table) to include the new static route.

As another example, controller 74 may send data 75 to router 70 invoking an add route method of API 76. The data 75 may specify an identifier for dynamic prefix list 14 (e.g., "ROUTE-TABLE-NAME") and include a prefix and prefix length for the route 68 to be added. The data 75 may optionally include a next hop for the route 68. Routing protocol process 44 processes the data 75 to add the route to dynamic prefix list 14.

As another example, policy engine 10 may apply one of import routing policies 61A to a route 68 received by one of routing protocols 58, in which the applied import routing policy causes policy engine 10 to add the route 68 to dynamic prefix list 14. An example import routing policy for importing routes to dynamic prefix list 14 is as follows:

```
routing-options {
    rib my-dyn-pfx-table.inet.0;
        rib-groups {
            my-dyn-pfx-rg {
                import-rib [ inet.0 my-dyn-pfx-table.inet.0 ];
                import-policy my-policy;
            }
        }
}
policy-options {
    policy-statement my-policy {
        from {
            protocol bgp;
            community my-comm.;
        }
        then accept;
    }
    community my-comm members 100;
}
protocols {
    bgp {
        group ibgp {
            family inet {
                unicast {
                    rib-group my-dyn-pfx-rg;
                }
            }
        }
    }
}
```

In the above example, my-dyn-pfx-table.inet.0 is a name for a routing table (or RIB table) used to store prefixes for an example of dynamic prefix list 14 according to techniques here. Also, my-dyn-pfx-rg is a name of an example of RIB group, import-rib [inet.0 my-dyn-pfx-table.inet.0] specifies that routes learnt by a protocol (e.g., BGP) are to be imported, per this RIB group definition, to the inet.0 routing table and to my-dyn-pfx-table.inet.0, and import-policy my-policy is a reference to an import policy for copying routes into the dynamic prefix list 14 ("my-dyn-pfx-rg"). In addition, my-policy is the policy defined and that can be applied for importing routes into a table, where the policy specifies that it accepts routes from BGP ("protocol bgp") that have a specified BGP community attached ("community my-comm"), where the BGP community is defined as community my-comm members 100. The rib-group my-dyn-pfx-rg statement in protocols specifies that the router having the configuration is to apply the my-dyn-pfx-rg RIB group to family inet routes learned by BGP ("bgp").

Routing protocols 58 may also export routes from dynamic prefix list 14.

When a prefix list stored by configuration database 65 is modified to include a new prefix, routing protocol process 44 re-applies policies 61 that reference the prefix list to, e.g., filter prefixes in a routing table 60 that match a prefix the prefix list and should be rejected as the action for a route filter policy. Routing protocol process 44 processes each route in the routing table against the prefixes in the prefix list using the route filter policy.

As described herein, the routing policy language for expressing routing policies 61 is extended to use, in place of a prefix list, the routing table operating as dynamic prefix list 14. For example, the routing policy language may have a syntax element for identifying a dynamic prefix list, e.g., for use with a route filter. The syntax element in one instance is dynamic-route-filter-list and is followed by the name of a routing table, but other syntax elements may be used. As one example of the above syntax element, dynamic-route-filter-list <ROUTE-TABLE-NAME>specifies dynamic prefix list 14 for use as a list of prefixes in a route filter for router 70.

Example configuration data including a policy statement that defines a named routing table <ROUTE-TABLE-NAME>for dynamic prefix list 14 and filters routes using prefixes of the dynamic prefix list 14 is as follows:

```
policy-options {
    policy-statement customer-routes {
        term X {
            from dynamic-route-filter-list <ROUTE-TABLE-NAME>;
            ...
        }
        then accept;
    }
    term others {
        then reject;
    }
}
routing-options {
    rib {
        <ROUTE-TABLE-NAME> {
            # optional static route entries
            static {
                route 192.168.1.0/24 . . .
                route 192.168.0.0/16 . . .
            }
        }
    }
}
```

The above policy statement customer-routes with term X may represent one of routing polices 61 of router 70 and define a policy for accepting only routes that match a prefix in dynamic prefix list 14.

Policy engine 10 (as a component of routing protocol process 44 or separately) may register for route notification events on routes for the dynamic prefix list 14. Each such route notification event may specify the corresponding route in the dynamic prefix list 14 that has been added, updated, or deleted and for which the route notification event was generated.

Accordingly, upon receiving a route notification event indicating a route, the policy engine 10 can efficiently lookup any routes in any of routing tables 60 matching the route in dynamic prefix list 14 that is referred to by a routing policy and reevaluate one or more routing policies 61 only for the affected, matching routes of the routing table 60. The policy engine 10 may therefore avoid reevaluating routes of the routing table 60 that do not match the route indicated in the route notification event, i.e., the added, deleted, or updated prefix for dynamic prefix list 14. For example, controller 74 may delete a prefix 172.16.1.16/28 from dynamic prefix list 14 via API 76. In response to the dynamic prefix list update, routing protocol process 44 sends a route notification event indicating the prefix to policy engine 10 and indicating the dynamic prefix list 14. Policy engine 10 may, in response to the route notification event, apply one or more routing policies 61 that reference the dynamic prefix list 14. For instance, policy engine 10 may apply the customer-routes policy to routes in one of routing tables 60. Because customer-routes is a route filter that rejects routes that are not in dynamic prefix list 14, policy engine 10 deletes (i.e., rejects) any routes in the routing table 60 that matches the deleted prefix.

Some examples of a routing policy may use a dynamic prefix list specify routes that are to be rejected. In such examples, adding a route to dynamic prefix list 14 causes policy engine 10 to delete prefixes in the routing table 60 (managed by such routing policies) matching the added route. The route may be added to dynamic prefix list 14 via API 76 by controller 72. While the above examples are described with respect to route filtering applied to routing tables, similar examples apply for routing policies applied for exporting routes from the routing tables 60.

Figure 3:
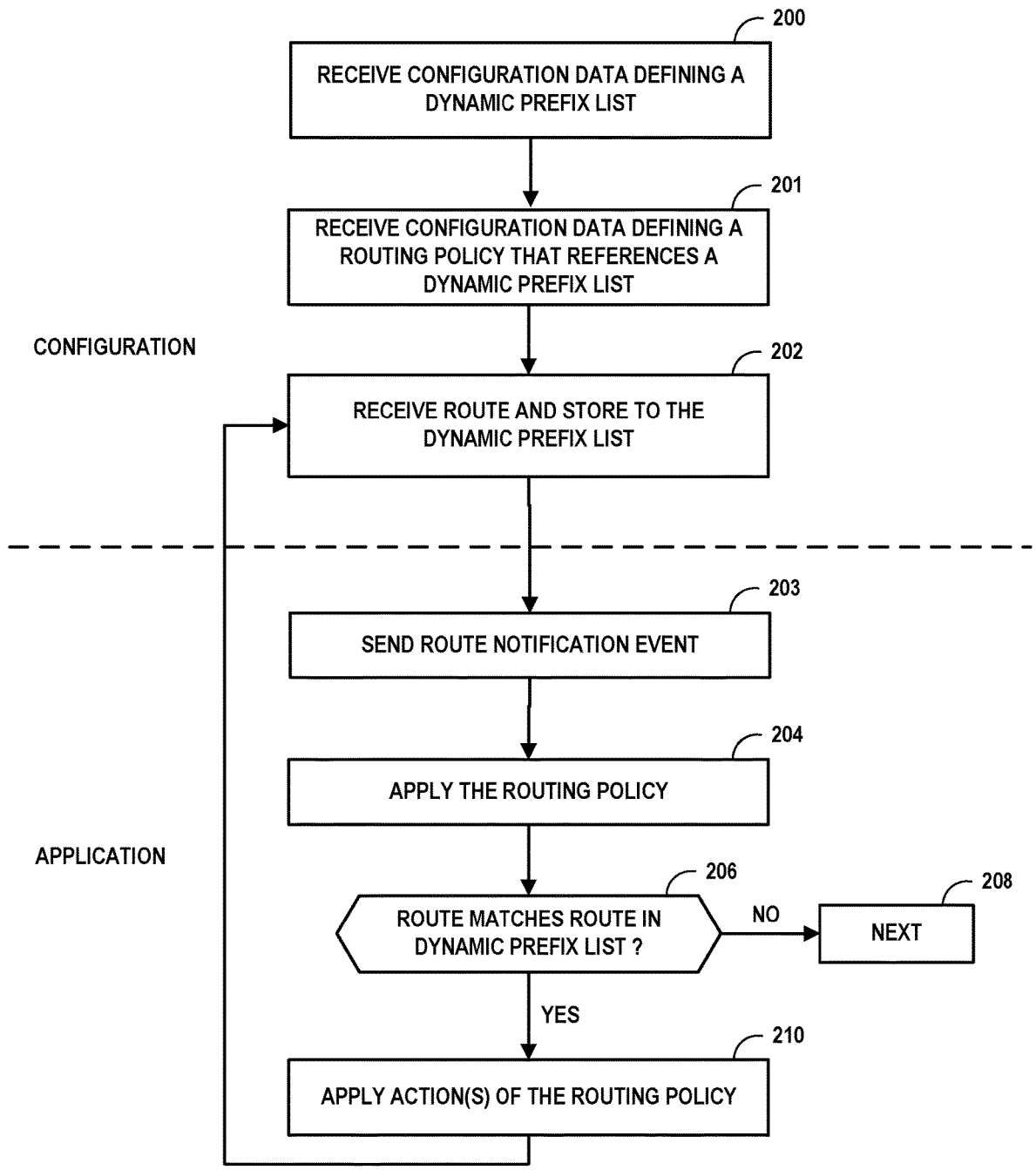
FIG. 3 is a flowchart illustrating an example mode of operation for a network device configured with a dynamic prefix list, in accordance with techniques described herein.

FIG. 3 is a flowchart illustrating an example mode of operation for a network device configured with a dynamic prefix list, in accordance with techniques described herein. The mode of operation is described with respect to router 70 of FIG. 2. Router 70 receives, via configuration interface 73, configuration data defining a dynamic prefix list 14 that is implemented as a routing table of the router 70 (200). Route 70 stores the configuration data to configuration database 65. The dynamic prefix list may be defined at the rib level of the configuration database 65. Router 70 receives configuration data defining a routing policy 61 that references the dynamic prefix list 14 (201). Router 70 subsequently receives a route 68 (e.g., from controller 74 via API 76) and stores the route to the dynamic prefix list 14 (202).

The update to the dynamic prefix list 14 causes routing protocol process 44 to send a route notification event to policy engine 10 to cause policy engine 10 apply the routing policy 61, defined at step 201, that references the dynamic prefix list 14 (204). The route notification event indicates the added route of dynamic prefix list 14. If the route matches a route in a routing table 60 for which the routing policy 61 applies (YES branch of 206), policy engine applies the one or more actions of the routing policy 61 to the matching route (210). For routes in the routing table 60 that do not match the added route of dynamic prefix list 14 (NO branch of 206), policy engine 10 may in some cases apply the "next" policy statement or term (208). Alternatively, policy engine 10 may only apply the routing policies to matching, affected routes.

Figure 4:
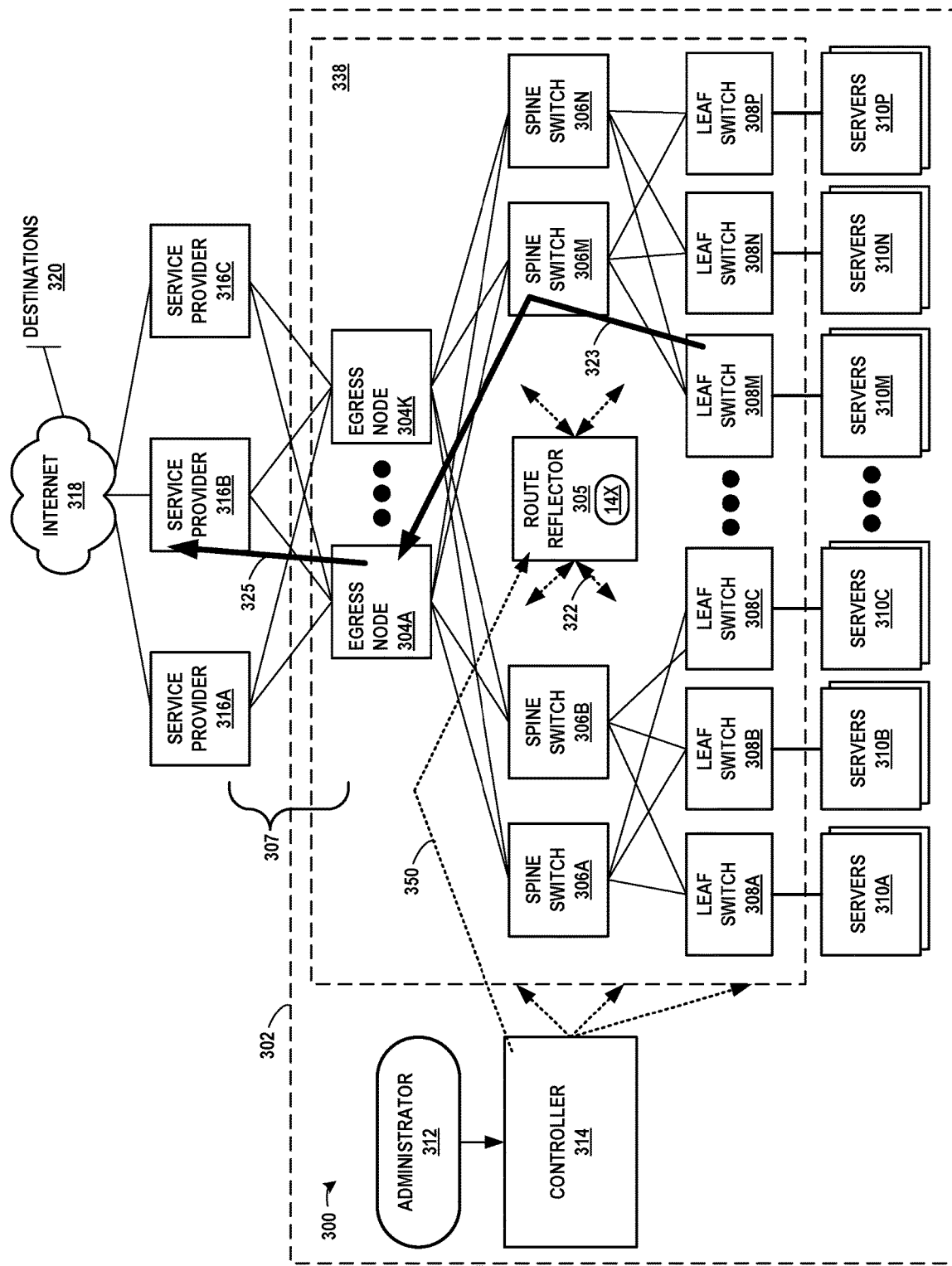
FIG. 4 is a block diagram illustrating an example network including a data center in which examples of the techniques described herein may be implemented.

FIG. 4 is a block diagram illustrating an example network 300 including a data center 302 in which examples of the techniques described herein may be implemented. In general, data center 302 provides an operating environment for applications and services for customers 120 coupled to the data center, e.g., by a service provider network (not shown). Data center 302 may, for example, host infrastructure equipment, such as networking and storage systems, redundant power supplies, and environmental controls. Service provider networks 316A-316C couple customer networks having destinations 320 to data center 302. Service provider networks 316 may be coupled to one or more networks administered by other providers, and may thus form part of a large-scale public network infrastructure, e.g., the Internet.

In some examples, data center 302 represents one of many geographically distributed network data centers. Data center 302 may be a facility that provides network services for customers. Customers may be collective entities such as enterprises and governments or individuals. For example, network data center 302 may host web services for several enterprises and end users. Other exemplary services may include data storage, virtual private networks, traffic engineering, file service, data mining, scientific- or super- computing, and so on. In some embodiments, data center 302 may be individual network servers, network peers, or otherwise. In some examples, data center 302 is an enterprise or internal data center.

In this example, data center 302 includes a set of storage systems and application servers 310A-310N (servers 310) interconnected via Internet protocol (IP) fabric 338, which may comprise a switch fabric provided by one or more tiers of physical network switches and routers. In the example of FIG. 1, IP fabric 338 includes three tiers: egress nodes 304A-304N (egress nodes 304), spine switches 306A-306N (spine switches 306), and leaf switches 308A-308C. It should be understood that other topologies may be used in other examples. Servers 310 provide execution and storage environments for applications and data and may be physical servers, virtual machines or combinations thereof.

In general, IP fabric 338 represents layer two (L2) and layer three (L3) switching and routing components that provide point-to-point connectivity between servers 310. In one example, IP fabric 338 comprises a set of interconnected, high-performance yet off-the-shelf packet-based routers and switches that implement industry standard protocols. In one example, IP fabric 338 may comprise off-the-shelf components that provide Internet Protocol (IP) over an Ethernet (IPoE) point-to-point connectivity.

In FIG. 4, controller 314 provides a high-level controller for configuring and managing routing and switching infrastructure of data center 302. Virtual network controller 314 may represent, for example, a software defined network (SDN) controller that communicates and manages the devices of data center 302 using an SDN protocol, such as the OpenFlow protocol. Additional details regarding OpenFlow are found in "OpenFlow Switch Specification version 1.1.0", OpenFlow Consortium, February 2011, which is incorporated by reference herein. In addition, controller 314 may communicate with the routing and switching infrastructure of data center 302 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Virtual network controller 314 provides a logically—and in some cases, physically—centralized controller for facilitating operation of one or more virtual networks within data center 302 in accordance with examples of this disclosure. In some examples, virtual network controller 314 may operate in response to configuration input received from network administrator 312. Additional information regarding virtual network controller 314 operating in conjunction with other devices of data center 302 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

Although not shown, data center 302 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within IP fabric 338, such as packet flows between servers 310, can traverse the physical network of IP fabric 338 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

As shown in the example of FIG. 4, each of egress nodes 304 is communicatively coupled to each of spine switches 306 in IP fabric 338. Spine switches 306A and 306B are coupled to each of leaf switches 308A-308C, while spine switches 306M and 306N are coupled to each of leaf switches 308M-308P. Nodes 304 and switches 306, 308 may communicate routes using internal BGP (I-BGP) directly, or using route reflector 305. Route reflector may have I-BGP sessions 322 with each of nodes 304 and leaf switches 308.

Egress nodes 304 may represent peering routers ("ERs", also referred to as autonomous system border routers (AS-BRs)) for data center 302 in that egress nodes 304 connect to service providers 316 via external BGP (E-BGP) peering links 307. The peering links may vary by available bandwidth, cost, latency, and reliability.

Leaf switches 308 may operate a ingress routers ("IRs") in that leaf switches 308 ingress traffic from servers 310 to the IP fabric 338 for egress by egress nodes 304 to service provider networks 316 for delivery to destinations 320. Traffic between egress nodes 304 and service providers 316 may be IP traffic that is not tunneled or labeled, e.g., for transport along a label switched path (LSP). The leaf switches 308 and egress nodes 304 are MPLS-capable.

By default, when an egress node 304 advertises routes to its I-BGP peers (directly to leaf switches 308 and/or via route reflector 305), for each destination, the egress node 304 selects one of the available routes from among multiple E-BGP routes learnt, via link 307, from various E-BGP peers or service provider 316 routers to an external destination, and the egress node 304 advertises the selected route to its peers. The egress node 304 also sets next-hop of the route to itself (nexthop-self), which hides the details of paths to destinations 320 the egress node 304 has available. As a result of this default behavior, leaf switches 308 do not have information describing all the paths available via egress nodes 304 to a given external destination 320. This may result in inefficient/sub-optimal use of the peering links 307.

In some cases, leaf switches 308 receive information describing the routes/paths available via egress nodes 304, in order to make select paths based on application use cases. Such use cases may include:

1. Selecting a peering link 307 based on latency and jitter for, e.g., real-time audio/video applications, 2. Unequally distributing traffic across peering links 307 based on bandwidth/cost, i.e., "weight balanced multi-path."

3. Using expensive links 307 as backup links.

To achieve the above, egress nodes 304 and route reflector 305 may enable BGP ADD-PATH capability to allow advertising of all of the learnt paths/routes to destinations 320 to the route reflector 305 and/or leaf switches 308.

Egress Peer Engineering (EPE) is a technique whereby traffic from a leaf switch 308 to a given external destination 320 is steered towards a specific service provider 316 or peering link 307 by manipulating the BGP route preferences and metrics, EPE builds on the BGP ADD-PATH capability to enable egress nodes 304 to advertise, to the route reflector 305 and/or leaf switches 308, all available paths using BGP-Labeled Unicast (BGP-LU). With BGP-LU, each egress node 304 may assign a unique MPLS label for each E-BGP peer (each service provider 316) it is connected to, and the egress nodes 304 includes these labels in the routes advertised to the route reflector 305 and/or leaf switches 308. When an egress node 304 advertises labeled routes, the egress node 304 may retain the E-BGP peer's next-hop address and eschew setting the next hop to itself. Leaf switches 308 will forward traffic destined towards the Internet 318 and destinations 320 via the egress node 304/E-BGP peer using the MPLS label advertised along with the route. When an egress node 304 receives a packet, by looking up the MPLS label that labels the packet, it knows which E-BGP peer (each service provider 316) the packet should be forwarded to for delivery to the destination. Additional details of EPE are found in "Egress Peer Engineering using BGP-LU," draft-gredler-idr-bgplu-epe-09, Internet Engineering Task Force, Inter-Domain Routing, Apr. 4, 2017, which is incorporated by reference herein in its entirety.

Leaf switches 308 tunnel MPLS packets labeled with the label for the route to the destination of the packets advertised by egress nodes 304. With EPE, leaf switches 308 have additional potential routes to a given destination 320 via the egress node 304 (as peering nodes) and their respective links 307. By default, the paths for the routes have the same weight and preference.

To steer traffic to a destination through a specific egress node 304 and/or peering link 307, route policies can be applied to set the route preferences at the egress nodes 304 to influence the selection of routes by the leaf switches 308. However, because the leaf switches 308 may learn all possible paths out of data center 302 towards a given destination 302, the number of routes learnt by each of leaf switches 308 increases by a significant factor (by approximately the product of the number of egress nodes 304 and the number of service provider 316 routers). Given that the Internet route table size is ~680,000 entries, this can impose significant resource consumption on the leaf switches 308 in both the control plane and the data plane.

In accordance with techniques described herein, to reduce the resource consumption on leaf switches 308, route reflector 305 may advertise only select routes of destinations 320 for select prefixes. Route reflector 305 may each represent an example router 8 of FIG. 1 or router 70 of FIG. 2, at least with respect to control plane functionality of route advertisement and application of routing policies. Route reflector 305 includes a dynamic prefix list 14X implemented as a routing table. Controller 314 dynamically configures dynamic prefix list 14X of route reflector 305 with the list of prefixes 350 to be advertised. Controller 314 may update dynamic prefix lists 14 frequently to meet the above use-cases, as well as other use-cases.

Controller 314 may be provisioned to determine the list of prefixes 350 for destinations 320 based on one or more criteria (e.g., cost per bit, quality of service, latency, and jitter). On today's Internet, ~3200 route entries are sufficient to reach ~90% of Internet-reachable destinations. ~26,000 routes entries are sufficient to reach 99% of Internet-reachable destinations.

A routing policy configured for route reflector 305 refers to dynamic prefix list 14X for the list of routes to be selectively advertised to leaf switches 308 using EPE. In this way, egress nodes 304 and leaf switches 308 may apply EPE and traffic steering to selected routes learnt by egress nodes 304 from service providers 316, rather than to all routes as specified by conventional EPE. For the rest of the destinations 320 (not included in dynamic prefix list 14X by controller 314), route reflector may advertise default route(s) resulting in a single route and/or equal-cost multipath (ECMP)-nexthop.

In the example of FIG. 4, egress node 304A advertises a labeled route to a prefix for one of destinations 320 using an I-BGP session 322, where the labeled route is for egressing traffic via service provider 316 on one of links 307 coupled to egress node 304A. Route reflector 305 applies the routing policy configured for route reflector 305 refers to dynamic prefix list 14X for the list of routes to be selectively advertised to leaf switches 308 using EPE, and according to the routing policy, accepts the labeled route because the labeled route is listed in dynamic prefix list 14X. Route reflector 305 therefore imports the labeled route and advertised the labeled route to leaf switch 308 using an I-BGP session 322. Leaf switch 308M forwards traffic destined to the prefix, according to the route, by labeling the traffic with the label included in the labeled route and outputting the labeled traffic 323 to egress node 304A, which removes the label and forwards the traffic 325 according to the label, via service provider 316B identified in egress node 304A by the label, The techniques may therefore significantly reduce the amount of forwarding plane resources required. In addition, because controller 314 may frequently update the list of prefixes in the dynamic prefix list 14X, the techniques may reduce control plane resource utilization over CLI-based configuration of a prefix list referenced by a route filter policy.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVTRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A network device comprising:
a control unit comprising one or more processors;
one or more interface cards coupled to the control unit;
a routing protocol process configured to execute on the control unit to exchange, using the interface cards, routing protocol advertisements with a peer network device in accordance with a routing protocol; and
a configuration database comprising a routing policy that references a dynamic prefix list comprising one or more prefixes,
wherein the routing policy includes at least one action for application to routes, stored to a first routing information base in conformance with a first instance of a data structure, for import or export, by the network device via a routing protocol, that match any of the one or more prefixes of the dynamic prefix list, and
wherein the dynamic prefix list comprises a second routing information base to store the one or more prefixes in conformance with a second instance of the data structure, the second routing information base separate from the configuration database.

2. The network device of claim 1, further comprising:
a policy engine configured to execute on the control unit to register for route notification events for the dynamic prefix list,
wherein the routing protocol process is configured to:
add a new route to the dynamic prefix list as a prefix of the one or more prefixes; and
generate and send a route notification event indicating the new route to the policy engine,
wherein the policy engine is configured to, responsive to the route notification event:
lookup, in the first routing information base, at least one route that matches the new route; and
apply the routing policy to at least one route that matches the new route.

3. The network device of claim 2,
wherein the policy engine is configured to not apply the routing policy to routes in the first routing information base that do not match the new route.

4. The network device of claim 1, further comprising:
a configuration interface configured to execute on the control unit to receive:
first configuration data defining the second routing information base, the first configuration data including an identifier for the routing table, and
second configuration data defining the routing policy to reference the identifier for the second routing information base as the dynamic prefix list.

5. The network device of claim 1, further comprising:
an application programming interface to the routing protocol process, configured to execute on the control unit to:

receive data indicating an add route method, the dynamic prefix list, and a new route;
responsive to the data, invoke the add route method to add the new route to the dynamic prefix list as a prefix of the one or more prefixes.

6. The network device of claim 5, further comprising:
a policy engine configured to execute on the control unit to register for route notification events for the dynamic prefix list,
wherein the routing protocol process is configured to generate and send, responsive to the addition of the new route to the dynamic prefix list, a route notification event indicating the new route to the policy engine,
wherein the policy engine is configured to, responsive to the route notification event:
lookup, in the first routing information base, at least one route that matches the new route; and
apply the routing policy only to the at least one route that matches the new route.

7. The network device of claim 1, wherein the routing policy conforms to a routing policy language extended to refer to the second routing information base as a prefix list for the dynamic prefix list.

8. The network device of claim 1,
wherein the configuration database comprises a definition for the second routing information base, the definition including an identifier for the second routing information base, and
wherein the routing policy comprises a dynamic route filter list syntax element that refers to the identifier for the second routing information base.

9. The network device of claim 1,
wherein the routing table comprises association data to associate at least one prefix of the second routing information base with an application executing on the control unit, and
wherein the routing protocol process is configured to delete, responsive to the application terminating and based on the association data, the at least one prefix from the second routing information base.

10. The network device of claim 1, wherein to apply the at least one action comprises to accept the routes for import or export.

11. The network device of claim 1,
wherein the configuration database comprises a definition for the second routing information base, the definition including one or more static routes,
wherein the routing protocol process is configured to process the definition for the second routing information base to generate the second routing information base including the one or more static routes as prefixes of the one or more prefixes of the dynamic prefix list.

12. A network system comprising:
a data center comprising:
an egress node that is connected via respective peering links to a plurality of service provider networks providing network reachability to destinations;
one or more leaf switches connected to the egress node;
a route reflector comprising a dynamic prefix list stored to a routing information base in accordance with an instance of a data structure developed for managing one or more network routes and exposing an application programming interface for configuring the dynamic prefix list within the routing information base;

a controller configured to invoke the application programming interface of the egress node to add one or more prefixes to the dynamic prefix list, wherein the egress node is configured to apply egress peer engineering to advertise, for receipt by the leaf switches, multiple labeled routes for each prefix of the one or more prefixes of the dynamic prefix list, the multiple labeled routes corresponding to the respective peering links of the plurality of service provider networks, wherein the route reflector is configured to receive the multiple labeled routes and advertise, for receipt by the leaf switches, a default route for at least one prefix that is not one of the one or more prefixes of the dynamic prefix list.

13. A method comprising:

executing, by a routing protocol process of a network device, a routing protocol to exchange routing protocol advertisements with a peer network device; and storing, to a configuration database, a routing policy that references a dynamic prefix list comprising one or more prefixes, wherein the routing policy includes at least one action for application to routes, stored to a first routing information base in conformance with a first instance of a data structure, for import or export, by the network device via the routing protocol, that match any of the one or more prefixes of the dynamic prefix list; and storing, to a second routing information base in conformance with a second instance of the data structure, the one or more prefixes for the dynamic prefix list, the second routing information base separate from the configuration database.

14. The method of claim 13, further comprising:

registering, by a policy engine of the network device, for route notification events for the dynamic prefix list;

adding, by the routing protocol process, a new route to the dynamic prefix list as a prefix of the one or more prefixes;

generating and sending, by the routing protocol process, a route notification event indicating the new route to the policy engine;

looking up, by the policy engine and in response to the route notification event, in the first routing table, at least one route that matches the new route; and apply, by the policy engine, the routing policy to at least one route that matches the new route.

15. The method of claim 14, further comprising:

not applying, by the policy engine, the routing policy to routes in the first routing table that do not match the new route.

16. The method of claim 13, further comprising receiving, by a configuration interface of the network device:

first configuration data defining the second routing information base, the first configuration data including an identifier for the second routing information base, and second configuration data defining the routing policy to reference the identifier for the second routing information base as the dynamic prefix list.

17. The method of claim 13, further comprising:

receiving, by an application programming interface to the routing protocol process, data indicating an add route method, the dynamic prefix list, and a new route;

invoking, by the application programing interface and in response to the data, the add route method to add the new route to the dynamic prefix list as a prefix of the one or more prefixes.

18. The method of claim 13, wherein the configuration database comprises a definition for the second routing information base, the definition including an identifier for the second routing information base, and wherein the routing policy comprises a dynamic route filter list syntax element that refers to the identifier for the second routing information base.

19. The method of claim 13, further comprising:

receiving, by the routing protocol process, a new route;

storing, by the routing protocol process, the new route as a prefix to the dynamic prefix list to generate an updated dynamic prefix list; and applying, by the routing protocol process, the routing policy using the updated dynamic prefix list.

20. A non-transitory computer-readable medium comprising instructions for causing one or more programmable processors to:

execute, by a routing protocol process of a network device, a routing protocol to exchange routing protocol advertisements with a peer network device; and store, to a configuration database, a routing policy that references a dynamic prefix list comprising one or more prefixes, wherein the routing policy includes at least one action for application to routes, stored to a first routing information base in conformance with a first instance of a data structure, for import or export, by the network device via the routing protocol, that match any of the one or more prefixes of the dynamic prefix list; and store, to a second routing information base in conformance with a second instance of the data structure, the one or more prefixes for the dynamic prefix list, the routing table separate from the configuration database.

* * * * *